Sept. 18, 1945. C. C. FARMER 2,385,130
VARIABLE LOAD BRAKE
Filed July 17, 1943 2 Sheets-Sheet 1
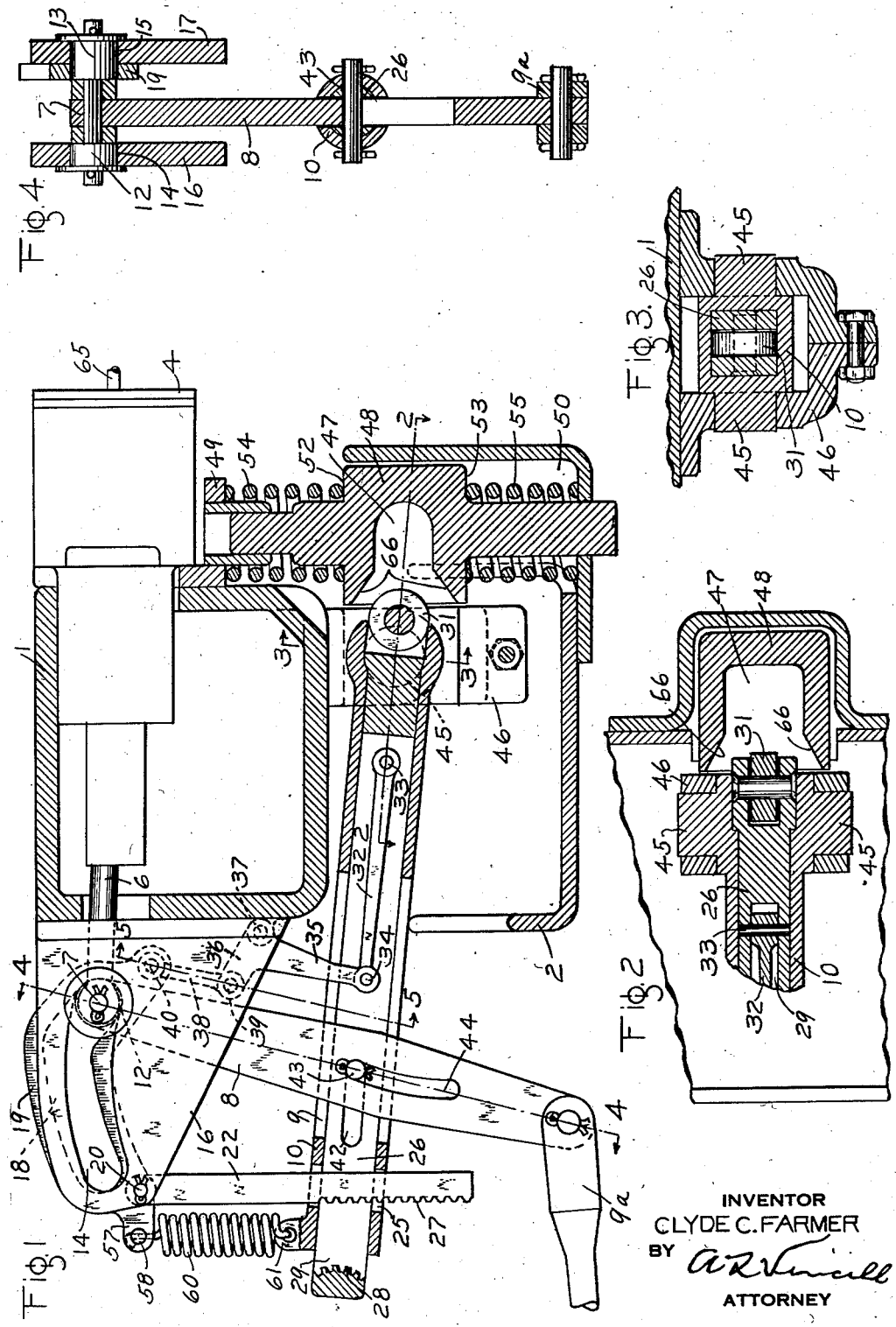
INVENTOR
CLYDE C. FARMER
BY
ATTORNEY Sept. 18, 1945. C. C. FARMER 2,385,130
VARIABLE LOAD BRAKE
Filed July 17, 1943 2 Sheets-Sheet 2
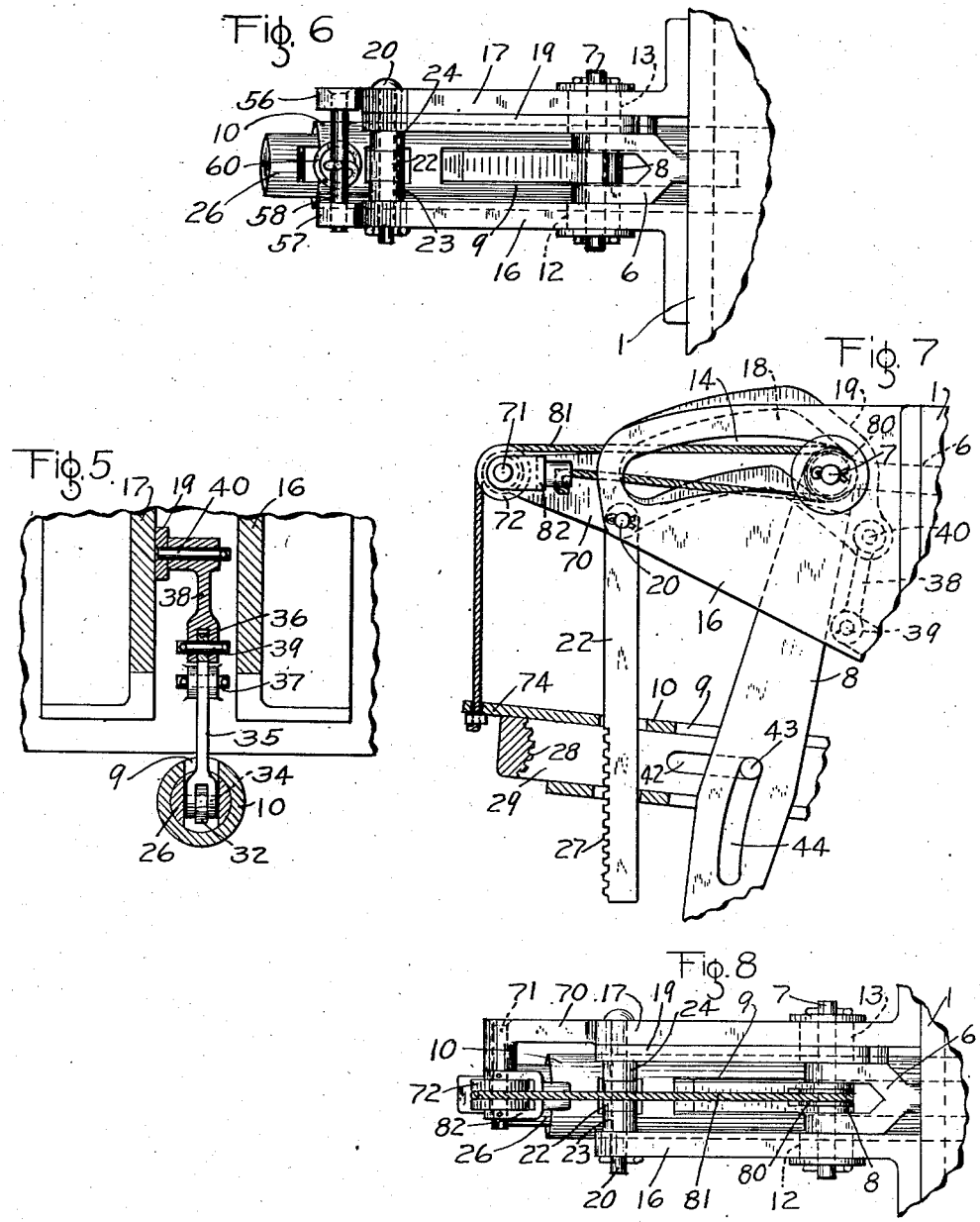
INVENTOR
CLYDE C. FARMER
BY
ATTORNEY Patented Sept. 18, 1945

2,385,130

UNITED STATES PATENT OFFICE 2,385,130

VARIABLE LOAD BRAKE

Clyde C. Farmer, Pittsburgh, Pa., assignor to The Westinghouse Air Brake Company, Wilmerding, Pa., a corporation of Pennsylvania Application July 17, 1943, Serial No. 495,158

19 Claims. (Cl. 188—195)

This invention relates to railway vehicle brake apparatus and more particularly to variable load brake rigging of the type in which the leverage may be automatically varied in accordance with variations in the weight of the load on the vehicle to correspondingly vary the force with which the brake is adapted to be applied.

The principal object of the invention is to provide an improved variable load brake rigging of the above mentioned type.

Another object of the invention is to provide a variable load brake rigging of the above mentioned type which is so constructed and arranged that it will be automatically conditioned or changed over from empty braking to any degree of load braking called for by the weight of the load carried by the body of the vehicle upon initial operation of the usual fluid pressure operated brake cylinder.

A further object of the invention is to provide a variable load brake rigging of the above mentioned type with means whereby the leverage of the brake rigging is varied according to the degree of relative movement between a sprung and an unsprung part of the vehicle only when an application of the brakes is initiated and whereby, at all other times, the means is uneffected by relative movement between said parts, thus insuring ample brake shoe clearance when the brakes are released.

Other objects and advantages will appear in the following more detailed description of the invention.

In the accompanying drawings,

Fig. 1 is a diagrammatic view, partly in section of a railway truck embodying the invention, parts of the truck and of the brake rigging being omitted to more clearly illustrate certain details of the invention.

Fig. 2 is a fragmentary sectional view taken on line 2—2 of Fig. 1.

Fig. 3 is a sectional view taken on line 3—3 of Fig. 1.

Fig. 4 is a sectional view taken on line 4—4 of Fig. 1.

Fig. 5 is a sectional view taken on the line 5—5 of Fig. 1.

Fig. 6 is a fragmentary sectional plan view showing the end of the brake cylinder push rod and the parts directly associated therewith.

Fig. 7 is a fragmentary sectional view illustrating a portion of the brake applying lever, the fulcrum for said lever and means for effecting movement of said fulcrum to its low leverage position upon movement of the brake cylinder to release position, which means may be substituted for the means disclosed in Fig. 1.

Fig. 8 is a plan view of the mechanism shown in Fig. 7.

As shown in Fig. 1 of the accompanying drawings, the variable load brake apparatus is applied to a railway vehicle truck which may be of the usual well known construction having a truck bolster 1, laterally spaced side frames (not shown) and a spring plank 2 which is supported by the truck side frames in the usual manner and upon which the usual truck bolster supporting springs (not shown) seat.

The variable load brake apparatus comprises the usual brake cylinder device having a cylinder 4 which is rigidly secured to the truck bolster 1 and which contains the usual piston (not shown) having a push rod 6 which projects beyond one end of the cylinder, the outer end of the rod being in the form of a jaw. This jaw is operatively connected by means of a pin 7, to the upper end of a vertically disposed brake cylinder lever 8 which extends into the jaw of the push rod 6. The lower or opposite end portion of the brake cylinder lever 8 passes through a longitudinally extending opening 9 provided in a hollow horizontally disposed arm 10 and is operatively connected to one end of a longitudinally extending pull rod 9a leading to the other brake rigging elements, not shown.

The pin 7, as best shown in Figs. 4 and 6, in addition to connecting the upper end of the brake cylinder lever 8 to the outer end of the push rod 6, also carries adjacent one side of the jaw of the push rod 6 a roller 12 and adjacent the opposite side of the jaw carries a roller 13. The rollers 12 and 13 are adapted to travel in an arced path defined by guide slots 14 and 15 provided in spaced guide brackets 16 and 17, respectively. These brackets are rigidly secured at one end, in any suitable manner, to the bolster 1 and extend outwardly therefrom in a direction parallel to the push rod 6.

The roller 13 is longer than the roller 12 and extends into a tortuous slot 18 provided in a substantially inverted V-shaped member 19 as viewed in Fig. 1 of the drawings which is interposed between the bracket 17 and the adjacent side of the push rod jaw. The member 19 which is provided for a purpose hereinafter described, is pivotally mounted on the outer ends of the brackets 16 and 17 by means of a pin 20 which extends between and is carried by the brackets.

The upper end of a substantially vertically disposed locking link 22 is pivotally mounted on pin 20 at a point substantially intermediate the ends of the pin and is retained in position by means of spacers 23 and 24 disposed one at each side of the link. The spacer 23 is interposed between the link 22 and bracket 16 while the spacer 24 is interposed between the member 19 and the link. The lower end portion of the link 22 passes through a slotted opening 25 provided in the arm 10, which arm has slidably mounted therein a member 26 having formed therein a longitudinally extending vertically disposed slotted opening 29 through which the link also passes. The slotted opening 29 also accommodates the brake cylinder lever 8. The lower end portion of the link 22 is provided with serrations or teeth 27 which are adapted to be engaged by teeth 28 with which the outer end of the slidably mounted member 26 is provided the toothed portion of the member defining one end of the slotted opening 29. The opposite end of the member 26 carries a roller 31 for a purpose presently described.

As best shown in Fig. 1 the slotted opening 29 of the member 26 extends from the toothed portion at one end to a point located a short distance to the left of the roller 31. This opening 29 accommodates a rod 32 which is operatively connected at one end by means of a pin 33 to the member 26. At its other this rod 32 is connected by means of a pin 34 to an arm 35 of a bell crank lever 36, which arm passes through the opening 9 in arm 10 and extends into the slotted opening 29. This bell crank is pivotally connected to the bolster 1 by means of a pin 37. The other arm of the bell crank 36 is connected to one end of a rod 38 by means of a pin 39, which rod is connected at its opposite end by means of a pin 40 to that end of the member 19 which is located farthest away from the pin 20 which pivotally connects the member to the brackets 16 and 17.

The member 26 is provided with longitudinally extending transversely disposed registering slotted openings 42 in which a fulcrum pin 43 is slidably mounted. This fulcrum pin also passes through a short slotted opening 44 formed in and extending in a direction longitudinally of the brake cylinder lever 8, which pin serves as a fulcrum for the brake cylinder lever.

The arm 10 is provided adjacent its inner end with trunnions 45 which are rockably mounted in a bearing member 46 that is rigidly carried by and extends downwardly from the underside of the bolster 1, and which comprises two like parts which are bolted together as shown in Fig. 3.

The roller 31 carried by the member 26 is arranged to be moved from the position in which it is shown in Figs. 1 and 2 of the drawings into a recess 47 formed in a vertically disposed member 48. The member 48 is movable vertically and is slidably guided at its upper end in a bracket 49 rigidly carried at one side of the bolster 1 and is slidably guided at its opposite or lower end in a bracket 50 rigidly carried by the truck spring plank 2. The member 48 is provided with an upper and lower spring seats 52 and 53, respectively. Interposed between the spring seat 52 and the bracket 49 is a spring 54 and interposed between the spring seat 53 and the bracket 50 is a spring 55.

As shown in Figs. 1 and 6 the brackets 16 and 17 are provided with lugs or extensions 56 and 57, respectively, which carry a pin 58. Connected to this pin is one end of a coil spring 60 which spring at its opposite end is connected to a lug 61 carried by the arm 10. This spring tends, at all times, to urge the arm 10 upwardly and thereby the fulcrum pin 43 to the upper end of the slotted opening 44 in the brake cylinder lever 8 as shown in Fig. 1 of the drawings.

It is obvious that any variation in the position of the fulcrum pin 43 with relation to the brake cylinder lever 8 within the slotted opening 44 will result in a variation in the leverage ratio of the brake rigging and thereby a variation in the braking power of the brake rigging.

If the fulcrum pin 43 is moved longitudinally in a direction away from the push rod 6 the arm of the brake lever 8 to which the push rod is connected, will be correspondingly lengthened, so that when the brake cylinder is operated the power transmitted by the opposite end of the lever to the pull rod 9a will be correspondingly increased. If the pin is moved from the lower end of the slotted opening in a direction toward the push rod 6 the power transmitted to the pull rod will be decreased.

It should here be mentioned that the arm 10 is operative to position the fulcrum pin 43 relative to the brake cylinder lever 8 within the slotted opening 44 in accordance with the load carried by the vehicle and that said lever is operative only upon the initiation of a brake application as will be fully described in connection with the operation of the apparatus.

It will be understood that as the load carried by the bolster 1 increases the usual truck bolster springs (not shown) will be compressed, so that the truck bolster will move downwardly relative to the spring plank 2 and that this movement will always be proportional to the degree of the load. As this movement is occurring in the present embodiment of the invention, the spring 54 will be compressed, the spring 55 being powerful enough that it will not be caused to respond to the load imposed thereon through the action of spring 54, thus member 48 will be maintained substantially stationary, with relation to the spring plank, in the position in which it is shown in Fig. 1.

*Operation*

Assuming the vehicle embodying the invention to be empty and the brakes on the vehicle released, the several parts of the apparatus will be in the position in which they are illustrated in Fig. 1, the spring 60 maintaining the arm 10 and thereby the fulcrum pin 43 in its empty braking position.

When it is desired to effect an application of the brakes, fluid under pressure is supplied to the brake cylinder, in the usual manner by way of a pipe 65. Fluid under pressure, thus supplied to the brake cylinder causes the usual piston thereof (not shown) to operate to move the push rod 6 in a direction toward the left-hand from the position in which it is shown in Fig. 1 of the drawings. The push rod, as it is thus moved causes the upper end of the brake cylinder lever 8, pin 7 and rollers 12 and 13 carried thereby to move in the same direction, the engagement of the rollers with the walls of the guide slots 14 and 15 insuring the proper line of travel of the parts. The tortuous slot 18 in the member 19 is of substantially inverted V-shape, as viewed in Fig. 1, the right-hand end of the slot being shorter than the left-hand end. Since the roller 13 is disposed in this slot, the pin 7, as it is moved in the direction toward the left-hand by the push rod, causes roller 13 to travel along the right-hand end of the slot 18, and due to the engagement of the roller with the walls of the slot will cause the member 19 to rock in a clockwise direction about the pin 20. As the member 19 is thus rocked it imparts movement in a downwardly direction to the rod 38. Downward movement of the rod 38 causes the bell crank lever 36 to rotate in a counterclockwise direction about pin 37, thereby causing the arm 35 to rock in the same direction. As the arm 35 is thus rocked it moves the rod 32 in a direction toward the right-hand, the rod 32 actuating the member 26 disposed within arm 10 and thereby the roller 31 in the same direction, the member and roller moving relative to the fulcrum pin 43 in the slotted opening 42, the roller 31 moving toward the recess 47 provided in the member 48 and the teeth 28 carried at the opposite or outer end of the member moving toward the link 22.

Since the vehicle is empty the truck bolster 1 will be in its normal position so that the roller 31 will be in alignment with the recess 47 in the member 48.

As the push rod 6 continues to move outwardly, i. e., toward the left-hand, the member 19 continues to rock about the pin 20. This rocking action continues until the roller 13 passes over the apex of the lower portion of the wall of the slot 18. When this occurs the left-hand end of the slot 18 will be brought into alignment with the guide slots 14 and 15 in the guide brackets 16 and 17. In practice when this is accomplished the push rod 6 will have moved a distance of approximately three inches from the position in which it is shown in Fig. 1. At this time the member 26 will have moved the roller 31 carried by the inner end of the member 26 into the recess 47 in the member 48 and the teeth 28 on the member 26 into locking engagement with the teeth 27 on the locking link 22. From the foregoing it will be understood that movement of the roller 31 into the recess 47 will in no way affect the position of the arm 10, so that the fulcrum pin 43 carried by the lever will remain positioned in the upper end of the slotted opening 44 in the brake cylinder lever 8 and the rigging will be in condition for empty vehicle braking.

It will here be noted that limited movement of the push rod 6 thus far described causes the member 19 to actuate the member 26 to lock the arm 10 and thereby the fulcrum pin 43 against movement relative to the brake cylinder lever 8 within the slotted opening 44, but the movement of the brake cylinder lever about the pin 43 is insufficient to cause the pull rod 9a to move far enough to effect movement of the usual brake shoes (not shown) into engagement with the treads of the vehicle wheels.

Now with the left-hand end of the slot 18 in alignment with the guide slots 14 and 15 in the brackets 16 and 17, respectively, no further rocking action of the member 19 will occur as the push rod 6, the upper end of the brake cylinder lever 8 and the rollers 13 and 14 are moved in unison in a direction toward the left-hand. As the push rod continues to move, the brake cylinder lever 8 rocks about its fulcrum pin 43 in the usual manner to move the pull rod 9a to cause the brake shoe to engage the treads of the vehicle wheels and thereby effect an application of the brakes.

It should here be mentioned that when the brakes on the vehicle are applied with the vehicle in transit and the fulcrum pin 43 locked in any position within the slotted opening 44 by interengagement of the teeth on the member 26 with the teeth 27 of the link 22 the relative movement between the truck bolster 1 and the spring plank 2 will be cushioned by the springs 54 and 55. This spring cushioning arrangement will prevent excessive heavy shocks due to such relative movement being imposed upon the member 26 and thereby upon the locking portions.

When it is desired to effect a release of the brakes fluid under pressure is vented from the brake cylinder 4 to the atmosphere by way of pipe 65 in the usual well known manner. As the pressure of fluid in the brake cylinder reduces, due to such venting, the usual brake cylinder release spring (not shown) acts on the brake cylinder piston to cause the push rod 6 to move in a direction toward the right-hand to the position in which it is shown in the drawings.

The push rod 6 as it is thus moved, causes the upper end of the brake cylinder lever 8, pin 7 and rollers 12 and 13 carried thereby to move in unison with the push rod. Such movement causes the brake cylinder lever 8 to rock in a clockwise direction about the fulcrum pin 43 to effect a release of the brakes on the vehicle in the usual manner. When the push rod 6 has returned to the position in which the roller 13 is about to enter the right-hand end of the slot 18, i. e., within approximately three inches of its full release position, the brake cylinder lever 8 will have been moved a sufficient distance to relieve the brake shoes of the braking force. From this it will be understood that the apparatus as a whole will at this time be relieved of braking stresses. It will be understood that up to this time the operation of roller 13 has not imparted any material movement to the member 19.

Now as the roller 13 traverses the right end of the slot 18, counterclockwise rocking movement about pin 20 is imparted to the member 19 due to the engagement of the roller 13 with the walls of the slot 18. The member 19 as it is then rocked in a counterclockwise direction causes the rod 38, bell crank 36 and rod 32 to operate to shift the member 26 in a direction toward the left-hand the member 26 moving relative to the fulcrum pin 43. As movement of the member 26 is continued in this direction the roller 31 carried by the inner end of the member and the teeth 28 carried by the outer end of the member are caused to move in the same direction. When the member has moved a distance sufficient to cause the roller 31 to move out of engagement with the walls of the recess 47 in the member 48, the teeth 28 will have been moved out of engagement with the teeth 27 on the link 22. When this occurs the spring 60 will act to maintain the arm 10 and associated parts in the position in which they are shown in Fig. 1 of the drawings.

From the foregoing description it will be noted that when the brakes on the vehicle are released the arm 10 and thereby the fulcrum pin 43 are completely detached from the member 48, so that unwanted operation of the mechanism will not occur as a result of relative movement between the sprung and unsprung parts of the truck, thus unnecessary wear of the parts is prevented when the vehicle is in transit and the brakes released. It will also be noted that when the brakes are released, the teeth 28 are moved out of locking engagement with the teeth of the link 22, and the spring 60 acts through the medium of the arm 10 and member 29 to maintain the fulcrum pin 43 in the upper end of the slotted opening 44, i. e., in the low leverage position, so as to insure the obtaining of adequate clearance between the brake shoes and the treads of the vehicle wheels.

Assuming now that, while the vehicle brakes are released, lading is placed on the body of the vehicle. Under the influence of the additional weight which the lading imposes on the vehicle body and thereby the truck bolster, the bolster springs (not shown) will yield and permit the bolster 1, and the bracket 46 to move downwardly causing the arm 10 carried thereby to rock downwardly about the trunnions 45 relative to the spring plank 2. As the bolster thus moves the spring 54 yields and therefore becomes partially compressed, the spring 55, which as before mentioned, having sufficient strength to maintain the member 48 in the position in which it is shown against the pressure exerted on the member by the compressed spring 54. The bolster 1 as it is thus moved downwardly relative to the spring plank 2 causes the roller 31 carried by the arm 10 to be moved downwardly out of direct alignment with the recess 47 in the member 48 for a purpose presently described. In other words the member 48 will remain in the position in which it is shown in Fig. 1 and the roller 31 will be moved downwardly from the position in which it is shown.

Now, if the vehicle is placed in a train; and it is desired to effect an application of brakes on the vehicle as fully or partially loaded, fluid under pressure is supplied to the brake cylinder 4 through the pipe 65. As the pressure of fluid in the brake cylinder 4 increases the push rod 6 moves in a direction toward the left-hand carrying the pin 7, the upper end of brake cylinder lever 8 and the rollers 12 and 13 with it, thus effecting clockwise rotation of the member 19 about pin 20 to cause the member 26 to move in a direction toward the right-hand in the same manner as hereinbefore described in connection with empty vehicle braking.

Since the roller 31 is now out of direct alignment with the recess 47 in the member 48 as already described, continued movement of the member 26 in a direction toward the right-hand will cause the roller 31 to be moved into engagement with a sloping surface 66 provided on the member 48 for guiding the roller into the recess. As the member 26 continues to move in a direction toward the right-hand the roller 31 is caused to move upwardly along the sloping surface 66 thereby causing that portion of the member which now extends to the right of the bracket 46 to move in the same direction. This causes the arm 10 to rock in a counterclockwise direction about the trunnions 45 of the arm. This rocking movement of the arm 10 causes the outer end of the arm to move downwardly. The arm as it moves carries the fulcrum pin 43 with it, the pin moving in the slotted opening 44 in the brake cylinder lever 8. When the roller 31 enters the recess 47 the member 26 will have moved in a direction to the right a distance sufficient to move the teeth 28 thereon into interengagement with the teeth 27 of the link 22 to lock the arm 10 and thereby the fulcrum pin 43 in its adjusted position within the slotted opening 44. From this it will be understood that the fulcrum pin 43 will be automatically positioned relative to the brake cylinder lever 8 to provide for the degree of braking called for by the weight of the lading placed on the vehicle.

When the roller 31 is moved into the recess 47 and the teeth 28 have moved into locking engagement with the link 22, the push rod 6 will have moved approximately three inches so that the left-hand end of slot 18 in the member 19 will be in alignment with the slots 13 and 14 in the brackets 15 and 16, respectively, as hereinbefore described in connection with empty vehicle braking. After the left-hand end of slot 18 is aligned with slots 13 and 14 continued movement of the push rod 6 causes the brake cylinder lever 8 to rock about the pin 43 to actuate the brake shoes into engagement with the treads of the adjacent wheels to effect the brake application. It will be understood that since the fulcrum pin 43 has been moved in a direction away from the push rod 6 a greater distance than for empty braking, the braking power applied to the shoes will be greater than that applied for empty braking.

When fluid under pressure is released from the brake cylinder 4 in the usual manner to effect a release of the brakes, and when the push rod 6 has returned to within approximately three inches of its full release position, the action of the member 19 will cause the member 26 to move in a direction toward the left-hand in the same manner as previously described in connection with empty vehicle braking. The member 26 as it moves in this direction will move the teeth 28 thereof out of engagement with the teeth 27 of the link 22 to unlock the arm 10 and then move the roller 31 out of the recess 47 to the position shown. When this occurs the spring 60 will again act to move the fulcrum pin 43 to the upper end of the slot 44 for the reason already described in connection with a release after an application of the brakes on an empty vehicle.

In Figs. 7 and 8 there is shown another form of mechanism for maintaining the arm 10 and thereby the fulcrum pin 43 in the upper end of the slotted opening 44 i. e., in the low leverage position, when the brakes are released. This mechanism is similar to that shown in Figs. 1 and 2 but differ therefrom in that the extension 56 and 57 provided on the brackets 16 and 17, respectively, the pin 58 and spring 60 are omitted and a bracket 70 is provided which may be integral with the bracket 17. This bracket 70 carries a pin 71 on which is mounted a pulley 72. In addition the brake cylinder lever 8 is provided with a jaw in which a pulley 80, carried by the pin 7, is disposed. The lug 61 is omitted from the arm 10 and an extension 74 preferably comprising an integral part of the arm 10 is provided, which extension has connected thereto one end of a cable 81. This cable 81 passes over pulleys 72 and 80 and is attached at its opposite end to a member 82 carried by the pin 71. It will be understood that by this arrangement the arm 10 and thereby the pin 43 will be maintained in its low leverage position, as shown in Fig. 7 of the drawings, due to the action of the usual brake cylinder release spring (not shown), when the brake cylinder lever 8 is in its release position. When an application of the brakes is initiated on a vehicle embodying this form of the invention, the usual brake cylinder piston (not shown) and thereby the piston rod 6 is caused to move from the position in which it is shown in Figs. 7 and 8 of the drawings in a direction toward the left hand under the influence of fluid under pressure supplied to the brake cylinder. The push rod, as it is thus moved causes the upper end of the brake cylinder lever 8, pin 7 and rollers 12 and 13 carried thereby to move in the same direction, thus effecting clockwise rotation of the member 19 about pin 20 to cause the member 26 to move in the same manner as hereinbefore described in connection with Figs. 1 to 6, inclusive. At the same time initial movement of the piston rod 6, in a direction toward the left hand, creates slack in the cable 81, whereupon gravity, due to the unbalanced condition of arm 10, will act to effect counterclockwise rotation of the arm about the trunnions 45 to move pin 43 downwardly in slot 42. However, initial movement of the member 26 in a direction toward the right hand will cause roller 31 to be moved into engagement with the sloping surface 66 provided on the member 48 for guiding the roller into the recess 47 so that counterclockwise rotation of arm 10 will be brought to a stop when said roller engages the surface 66.

If the vehicle is empty the bolster will be in its normal position and when an application of the brakes is effected the arm 10 will be brought to a stop, in the manner just described, before it materially affects downward movement of pin 43 and will be returned to the position in which it is shown upon movement of roller 31 into the recess 47, the arm 10 rocking clockwise about trunnions 45 to move the pin upwardly in the slot.

If the vehicle is either partially or fully loaded the bolster is moved downwardly relative to the spring plank so that when an application of the brakes is initiated gravity will move the arm 10 and thereby pin 43 downwardly in slot 42 a substantial distance before roller 31 engages the surface 66. However, movement of roller 31 into recess 47 will through the medium of arm 10 and trunnions 45 position the pin in accordance with the loaded condition of the vehicle as hereinbefore described.

From the foregoing description in connection with Figs. 1 to 6, inclusive, it will be understood the pin 43 will be adjusted and locked in position before the brake shoes (not shown) engage the vehicle wheels. It will also be understood that this arrangement will permit movement of the arm and thereby the pin to the fully loaded position when the roller 13 passes over the apex of the lower portion of the wall of the slot 18 when an application of the brakes is effected.

It will be seen that this embodiment differs from that of Figs. 1 to 6 inclusive in that the arm 10 is raised to its low leverage position by the cable 81 instead of by a spring and that the slack created in cable 81 upon initiating an application of the brakes permits gravity to assist in positioning the arm 10 and thereby pin 43.

Aside from this difference the apparatus disclosed in Figs. 7 and 8 will operate in identically the same manner as the apparatus of Figs. 1 to 6 inclusive.

Having now described my invention, what I claim as new and desire to secure by Letters Patent, is:

1. In a vehicle variable load brake apparatus for a vehicle, in combination, a brake lever, a brake cylinder for actuating said lever, an adjustable fulcrum for said lever, said fulcrum having a normal position providing for empty vehicle braking and being movable therefrom to various other positions through a loaded vehicle zone for providing loaded vehicle braking, means for positioning said fulcrum in said loaded vehicle zone in accordance with the weight of the lading carried by the vehicle, and means operative only upon operation of said brake cylinder to actuate said lever for operating the first mentioned means.

2. In a vehicle variable load brake equipment of the type having a brake lever and a brake cylinder for actuating said lever, in combination, a fulcrum for said lever movable relative to the lever, fulcrum positioning means operative to position said fulcrum with relation to the lever according to the weight of the load carried on the vehicle, locking means for locking said fulcrum in the adjusted position, and means operated by said brake cylinder for effecting operation of said locking means.

3. In a vehicle variable load brake equipments of the type having a brake lever and a brake cylinder for actuating said lever, in combination, a fulcrum for said lever movable relative to the lever, fulcrum positioning means operative to position said fulcrum with relation to the lever according to the weight of the load carried on the vehicle, a locking element for locking said fulcrum in the adjusted position, and means operative to actuate said locking element, the last mentioned means being operative by said brake cylinder when the brake cylinder operates to actuate said lever.

4. In a vehicle variable load brake equipment of the type having a brake lever and a brake cylinder for actuating said lever, in combination, a fulcrum for said lever movable relative to the lever, fulcrum positioning means operative to position said fulcrum with relation to the lever according to the weight of the load carried on the vehicle, locking means for locking said fulcrum in the adjusted position, means operative by said brake cylinder for effecting operation of said fulcrum positioning means and said locking means.

5. In a variable load brake apparatus for a vehicle of the type having a brake lever operative for effecting an application of the brakes, in combination, a brake cylinder for actuating said lever, a shiftable fulcrum for said lever, said fulcrum having a position for providing empty vehicle braking and being shiftable therefrom to various other positions through a loaded vehicle zone for providing loaded vehicle braking, fulcrum shifting means movable in accordance with the weight of the lading carried by the vehicle for positioning said fulcrum in said loaded vehicle zone, and means operative only upon operation of said brake cylinder to effect an application of the brakes for operating said fulcrum shifting means.

6. In a variable load brake apparatus for a vehicle, in combination, a brake lever, a brake cylinder operatively connected to said lever, an adjustable fulcrum for said lever, said fulcrum having a brake controlling position for empty vehicle braking and being movable therefrom to various other brake controlling positions through a loaded vehicle zone, means movable in accordance with the weight of the lading carried for selectively moving said fulcrum to the appropriate one of said other control positions, and a lever mechanism associated with said brake cylinder for effecting operation of said means, said mechanism being operative only upon operation of said brake cylinder to actuate said brake lever to effect an application of the brakes for effecting operation of said means.

7. In a variable load brake apparatus for a vehicle, in combination, a brake lever, a brake cylinder operatively connected to said lever, an adjustable fulcrum for said lever, said fulcrum having a brake controlling position for empty vehicle braking and being movable therefrom to various other brake controlling positions through a loaded vehicle zone, means movable in accordance with the weight of the lading carried for selectively moving said fulcrum to the appropriate one of said other control positions, and a lever mechanism associated with said brake cylinder for effecting operation of said means, said mechanism being operative as an incident to the operation of said brake cylinder to effect an application of the brakes for effecting operation of said means.

8. In a variable load brake apparatus for a vehicle, in combination, a brake lever having a normal position for effecting a release of the brakes and operative therefrom to another position to effect an application of the brakes, a brake cylinder for controlling the operation of said lever, an adjustable fulcrum for said lever, said fulcrum having a brake controlling position for empty vehicle braking and being movable therefrom through a loaded vehicle zone, a control arm movable in accordance with the weight of the lading carried for selectively moving said fulcrum to the appropriate one of said other controlling positions, lever mechanism associated with said brake cylinder and said brake lever for effecting operation of said control arm, said lever mechanism being operative only upon movement of said brake lever from said normal position to said other position to effect operation of said control arm to position said fulcrum in the appropriate position in the loaded vehicle zone, and means associated with said lever mechanism for insuring operation of said control arm to effect movement of said fulcrum to the position for empty vehicle braking upon operation of said brake lever from said other position to said normal position.

9. In a variable load brake rigging for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative to actuate the lever and thereby the member to effect an application of the brakes, a fulcrum for said lever, said fulcrum having a position for providing for empty vehicle braking and being movable therefrom to various other positions through a loaded vehicle zone for providing loaded vehicle braking, means movable in accordance with the relative movement between the fixed and movable parts of the vehicle for shifting said fulcrum relative to said lever, actuating means having a normal position for rendering said means inoperative and movable therefrom to another position for effecting operation of said means, and other means associated with said brake cylinder operative upon effecting an application of the brakes for moving said actuating means from said normal position to said other position.

10. In a variable load brake rigging for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative to actuate the lever and thereby the member to effect an application of the brakes, a fulcrum for said lever, said fulcrum having a position for providing for empty vehicle braking and being movable therefrom to various other positions through a loaded vehicle zone for providing loaded vehicle braking, means movable in accordance with the relative movement between the fixed and movable parts of the vehicle for shifting said fulcrum relative to said lever, actuating means having a normal position for rendering said means inoperative and movable therefrom to another position for effecting operation of said means, locking means for locking said actuating means in said other position, and lever means controlled by said brake cylinder operative when initiating an application of the brakes to first effect movement of said actuating means from said normal position to said other position and to then effect operation of said locking means to lock said actuating means in said other position.

11. In a variable load brake rigging for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative to actuate the lever and thereby the member to effect an application of the brakes, a fulcrum for said lever, said fulcrum having a position for providing for empty vehicle braking and being movable therefrom to various other positions through a loaded vehicle zone for providing loaded vehicle braking, means movable in accordance with the relative movement between the fixed and movable parts of the vehicle for shifting said fulcrum relative to said lever, actuating means having a normal position for rendering said means inoperative and movable therefrom to another position for effecting operation of said means, and lever means associated with said brake cylinder for controlling said actuating means, said lever means being operative upon effecting an application of the brake to move said actuating means from said normal position to said other position and upon a subsequent release of the brakes to move said actuating means from said other position to said normal position.

12. In a variable load brake rigging for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative to actuate the lever and thereby the member to effect an application of the brakes, a fulcrum for said lever, said fulcrum having a position for providing for empty vehicle braking and being movable therefrom to various other positions through a loaded vehicle zone for providing loaded vehicle braking, a control arm movable in accordance with relative movement between the fixed and movable parts of the vehicle for shifting said fulcrum relative to the brake lever, means having a normal position for rendering said control arm non-responsive to relative movement between the fixed and movable parts of the vehicle and operative to another position for rendering it responsive to such movement, a bell crank for actuating said means from said normal position to said other position, rocking means for actuating said bell crank, and means carried by said brake cylinder for actuating said rocking means upon operation of said brake cylinder to effect an application of the brakes.

13. In a variable load brake rigging for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative to actuate the lever and thereby the member to effect an application of the brakes, a fulcrum for said lever, said fulcrum having a position for providing for empty vehicle braking and being movable therefrom to various other positions through a loaded vehicle zone for providing loaded vehicle braking, a control arm movable in accordance with relative movement between the fixed and movable parts of the vehicle for shifting said fulcrum relative to the brake lever, an element slidably mounted in said arm and having a normal position for rendering said control arm non-responsive to relative movement between the fixed and movable parts of the vehicle and operative to another position for rendering it responsive to such movement, rocking means for actuating said element from said normal position to said other position and a member carried by said brake cylinder for actuating said rocking means, said member being operative as an incident to the operation of said brake cylinder to effect an application of the brakes for actuating said rocking means.

14. In a vehicle variable load brake equipment of the type having a brake lever and a brake cylinder including a push rod operatively connected to said lever for actuating said lever; in combination, a fulcrum for said lever movable relative to the lever, combined fulcrum positioning and locking means operative to first position said fulcrum with relation to the lever and to then lock said fulcrum in the adjusted position, said means comprising a rockable control arm for positioning said fulcrum relative to said brake lever, an element slidably mounted in said rockable control arm having a normal position for unlocking said arm and for rendering said control arm non-effective to position said fulcrum and another position for rendering the control arm effective to position said fulcrum and to lock said arm and thereby said fulcrum in the adjusted position, lever mechanism for actuating said element; and means carried by said brake cylinder push rod for effecting operation of said lever mechanism upon operation of said brake cylinder to effect an application of the brakes.

15. The combination with a vehicle truck of the type having a fixed part and a part movable vertically relative to said fixed part and with a variable load brake mechanism of the type comprising a brake lever having a fulcrum which is movable to vary the ratio of the lever and comprising means for actuating said lever, of an element rockably mounted on the vertically movable part of the truck for moving said fulcrum relative to said brake lever, said element being movable bodily with said vertically movable part, a strut member carried by said fixed part of the truck and being normally fixed in a given position with relation to the fixed part of the truck, and means carried by said element and movable longitudinally of the element into engagement with said strut member upon the operation of said brake lever by the lever actuating means, said means and said strut member cooperating to actuate said element to position said fulcrum.

16. The combination with a vehicle truck of the type having a fixed part and a part movable vertically relative to said fixed part and with a variable load brake mechanism of the type comprising a brake lever having a fulcrum which is movable to vary the ratio of the lever and comprising means for actuating said lever, of an element rockably mounted on the vertically movable part of the truck for moving said fulcrum relative to said brake lever, said element being movable bodily with said vertically movable part, a strut member carried by said fixed part of the truck and being normally fixed in a given position with relation to the fixed part of the truck, means carried by said element and movable longitudinally of the element into engagement with said strut member upon the operation of said brake lever by the lever actuating means, said means and said strut member cooperating to actuate said element to position said fulcrum, and means operative to lock said first mentioned means and thereby said element and said fulcrum in the adjusted position.

17. The combination with a vehicle truck of the type having a fixed part and a part movable vertically relative to said fixed part and with a variable load brake mechanism of the type comprising a brake lever having a fulcrum which is movable to vary the ratio of the lever and comprising means for actuating said lever, of an element rockably mounted on the vertically movable part or the truck for moving said fulcrum relative to said brake lever, said element being movable bodily with said vertically movable part, a strut member carried by said fixed part of the truck and being normally fixed in a given position with relation to the fixed part of the truck, slidable means carried by said element and movable longitudinally of the element and into engagement with said strut member upon the operation of said brake lever by the lever actuating means, said slidable means and said strut member cooperating to actuate said element to position said fulcrum, and means included in said slidable means and cooperating with the vertically movable part of the truck for locking said slidable means and thereby said element and said fulcrum in the adjusted position.

18. In a vehicle variable load brake apparatus for a vehicle, in combination, a brake lever, a brake cylinder for actuating said lever, an adjustable fulcrum for said lever, said fulcrum having a position providing for empty vehicle braking and being movable therefrom to various other positions through a loaded vehicle zone for providing loaded vehicle braking, means for normally maintaining said fulcrum in the position for empty vehicle braking, means for positioning said fulcrum in said loaded vehicle zone in accordance with the weight of the lading carried by the vehicle; and means operative only upon operation of said brake cylinder to actuate said lever for operating the second mentioned means.

19. In a vehicle variable load brake equipment of the type having a brake lever, in combination, a brake cylinder including a push rod for actuating said lever, a fulcrum for said lever movable relative to the lever, fulcrum positioning means operative to position said fulcrum with relation to the lever according to the weight of the lading carried on the vehicle, means for locking said fulcrum in the adjusted position, means operative to effect operation of said fulcrum positioning means and said locking means, and means operated by said push rod upon operation of said brake cylinder to actuate said lever for operating the first mentioned means.

CLYDE C. FARMER.